(12) United States Patent
Feblowitz et al.

(10) Patent No.: US 8,098,248 B2
(45) Date of Patent: *Jan. 17, 2012

(54) METHOD FOR SEMANTIC MODELING OF STREAM PROCESSING COMPONENTS TO ENABLE AUTOMATIC APPLICATION COMPOSITION

(75) Inventors: Mark D. Feblowitz, Winchester, MA (US); Zhen Liu, Tarrytown, NY (US); Anand Ranganathan, White Plains, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

This patent is subject to a terminal disclaimer.

(21) Appl. No.: 11/695,457

(22) Filed: Apr. 2, 2007

(65) Prior Publication Data

US 2008/0243451 A1 Oct. 2, 2008

(51) Int. Cl.
*G06T 11/20* (2006.01)
(52) U.S. Cl. ...................................... 345/440
(58) Field of Classification Search .................. 345/440
See application file for complete search history.

(56) References Cited

U.S. PATENT DOCUMENTS

| | | | |
|---|---|---|---|
| 5,295,261 A | 3/1994 | Simonetti | |
| 5,675,786 A | 10/1997 | McKee et al. | |
| 6,209,004 B1 | 3/2001 | Taylor | |
| 6,346,879 B1* | 2/2002 | Peled | 340/500 |
| 6,640,231 B1 | 10/2003 | Andersen et al. | |
| 7,016,910 B2 | 3/2006 | Egilsson et al. | |
| 7,036,720 B2* | 5/2006 | Mezard et al. | 235/375 |
| 7,150,400 B2* | 12/2006 | Melick et al. | 235/462.25 |
| 7,155,720 B2 | 12/2006 | Casati et al. | |
| 7,505,989 B2 | 3/2009 | Gardner et al. | |
| 7,798,417 B2* | 9/2010 | Snyder et al. | 235/494 |
| 7,877,421 B2 | 1/2011 | Berger et al. | |
| 7,882,485 B2* | 2/2011 | Feblowitz et al. | 717/104 |
| 7,899,861 B2* | 3/2011 | Feblowitz et al. | 709/201 |
| 7,904,545 B2 | 3/2011 | Golovchinsky et al. | |
| 2003/0120642 A1 | 6/2003 | Egilsson et al. | |
| 2003/0135628 A1* | 7/2003 | Fletcher et al. | 709/229 |
| 2003/0142818 A1 | 7/2003 | Raghunathan et al. | |
| 2003/0149714 A1 | 8/2003 | Casati et al. | |
| 2004/0054690 A1 | 3/2004 | Hillerbrand et al. | |

(Continued)

OTHER PUBLICATIONS

J. Heflin (2004). Web Ontology Language (OWL) use cases and requirements. W3C Recommendation 10th Feb. 2004. Available at: http://www.w3.org/TR/webont-req/.*

(Continued)

*Primary Examiner* — Javid Amini
(74) *Attorney, Agent, or Firm* — William J. Stock; F. Chau & Associates, LLC

(57) ABSTRACT

A method for modeling components of a stream processing application, includes: defining an input message pattern of a processing element, wherein the input message pattern includes variables representing data objects that must be included in a message input to the processing element, and a graph pattern that semantically describes the data objects that must be included in the message input to the processing element; and defining an output message pattern of the processing element, wherein the output message pattern includes variables and new data objects, the variables and new data objects representing data objects that must be included in a message output from the processing element, and a graph pattern that semantically describes the data objects in the message output from the processing element.

29 Claims, 8 Drawing Sheets

U.S. PATENT DOCUMENTS

| | | | |
|---|---|---|---|
| 2004/0073545 A1* | 4/2004 | Greenblatt et al. | 707/3 |
| 2004/0138936 A1 | 7/2004 | Johnson et al. | |
| 2004/0162741 A1 | 8/2004 | Flaxer et al. | |
| 2005/0021548 A1 | 1/2005 | Bohannon et al. | |
| 2005/0021745 A1 | 1/2005 | Bookman et al. | |
| 2005/0044525 A1* | 2/2005 | Lazarov | 717/104 |
| 2005/0114757 A1 | 5/2005 | Sahota et al. | |
| 2006/0047638 A1 | 3/2006 | Dettinger et al. | |
| 2006/0053172 A1 | 3/2006 | Gardner et al. | |
| 2006/0167946 A1 | 7/2006 | Hellman et al. | |
| 2006/0200251 A1 | 9/2006 | Gu et al. | |
| 2006/0212855 A1* | 9/2006 | Bournas et al. | 717/140 |
| 2007/0023515 A1 | 2/2007 | Urken | |
| 2007/0043803 A1 | 2/2007 | Whitehouse et al. | |
| 2007/0078815 A1 | 4/2007 | Weng et al. | |
| 2007/0156430 A1 | 7/2007 | Kaetker et al. | |
| 2007/0162893 A1 | 7/2007 | Moosmann et al. | |
| 2007/0168303 A1 | 7/2007 | Moosmann et al. | |
| 2007/0174811 A1 | 7/2007 | Kaetker et al. | |
| 2007/0179826 A1 | 8/2007 | Cutlip et al. | |
| 2007/0186209 A1 | 8/2007 | Kaetker et al. | |
| 2007/0198971 A1 | 8/2007 | Dasu et al. | |
| 2007/0220046 A1 | 9/2007 | Moosmann et al. | |
| 2007/0265862 A1 | 11/2007 | Freund et al. | |
| 2007/0288250 A1* | 12/2007 | Lemcke et al. | 705/1 |
| 2008/0005278 A1 | 1/2008 | Betz et al. | |
| 2008/0120129 A1 | 5/2008 | Seubert et al. | |
| 2008/0127064 A1 | 5/2008 | Orofino et al. | |
| 2008/0161941 A1 | 7/2008 | Strassner et al. | |
| 2008/0243449 A1* | 10/2008 | Feblowitz et al. | 703/2 |
| 2008/0243451 A1* | 10/2008 | Feblowitz et al. | 703/2 |
| 2008/0244236 A1* | 10/2008 | Feblowitz et al. | 712/220 |
| 2008/0250390 A1* | 10/2008 | Feblowitz et al. | 717/114 |
| 2008/0288595 A1* | 11/2008 | Liu et al. | 709/206 |
| 2008/0294644 A1* | 11/2008 | Liu et al. | 707/10 |
| 2010/0185700 A1* | 7/2010 | Bodain | 707/803 |
| 2010/0191521 A1 | 7/2010 | Huet et al. | |
| 2011/0004863 A1* | 1/2011 | Feblowitz et al. | 717/105 |

OTHER PUBLICATIONS

Bruijn "semantic Web Technologies: Advanced SPARQL" May 4, 2006.*

M. Sullivan. Tribeca: A stream database manager for network traffic analysis. In Proc. of the 22nd Intl. Conf. on Very Large Data Bases, Sep. 1996.

M. LeLarge, Z. Liu, and A. Riabov. Automatic composition of secure workflow. In ATC-06, 2006.

J. Ambite and C. Knoblock. Flexible and scalable query planning in distributed and heterogeneous environments. In AIPS'98, Jun. 1998.

H.Wang and C. Zaniolo: ATLaS: A Native Extension of SQL for Data Mining and Stream Computations, UCLA CS Dept., Technical Report, Aug. 2002.

M. A. Hammad, W. G. Aref, and A. K. Elmagarmid. Stream window join: Tracking moving objects in sensor-network databases. In Proc. of the 15th SSDBM Conference, Jul. 2003.

C. Cranor et al. Gigascope: A stream database for network applications. In SIGMOD, 2003.

S. Chandrasekaran et al. TelegraphCQ: Continuous Dataflow Processing for an Uncertain World. CIDR, 2003.

D. J. Abadi, et al: Aurora: a new model and architecture for data stream management. VLDB J. 12(2): 120-139 (2003).

Sheshagiri, M., desJardins, M., Finin, T.: A planner for composing services described in DAML-S. In: Web Services and Agent-based Engineering—AAMAS'03.

L'Ecu'e, F., L'Eger, A.: A formal model for semantic web service composition. In: ISWC. (2006).

B. Parsia and E. Sirin. Pellet: An OWL DL reasoner. In the Semantic Web—ISWC 2004, 2004.

N. Jain et al. Design, implementation, and evaluation of the linear road benchmark on the stream processing core. In SIGMOD'06, Jun. 2006.

A. Riabov, Z. Liu, Planning for Stream Processing Systems, in Proceedings of AAAI-2005, Jul. 2005.

Y. Gil,, E. Deelman, J. Blythe, C. Kesselman, and H. Tangmunarunkit. Artificial intelligence and grids: Workflow planning and beyond. IEEE Intelligent Systems, Jan. 2004.

D. B. Terry et al. Continuous queries over append-only databases. In SIGMOD, pp. 321-330, 1992.

C-N HSU and C. A. Knoblock. Semantic query optimization for query plans of heterogeneous multi-database systems, IEEE Transactions on Knowledge and Data Engineering, 12(6):959-978, Nov./Dec. 2000.

R. Ginis, R. Strom: An Autonomic Messaging Middleware with Stateful Stream Transformation, Proceedings of the International Conference on Autonomic Computing (ICAC'04).

A. Arasu, S. Babu, J. Widom. The CQL continuous query language: Semantic foundations and query execution. Technical Report 2003-67, Stanford University, 2003.

D.J. Abadi et al. The Design of the Borealis Stream Processing Engine (CIDR), Jan. 2005, Asilomar, CA.

Traverso, P., Pistore, M.: Automated composition of semantic web services into executable processes. In: ISWC. (2004).

Narayanan, S., McIiraith, S.: Simulation, verification and automated composition of web services. In: WWW. (2002).

Heflin, J., Munoz-Avila, H.: Low-based agent planning for the semantic web. In: Ontologies and the Semantic Web, 2002 AAAI Workshop.

Zhou, J., MA, L., Liu, Q., Zhang, L., YU, Y., Pan, Y.: Minerva: A scalable OWL ontology storage and inference system. In: 1st Asian Semantic Web Symp. (2004).

H. Knublauch, M. A. Musen, and A. L. Rector. Editing description logic ontologies with the protege owl plugin. Whistler, BC, Canada, 2004.

M. Stonebraker, U.çetintemel, S.B. Zdonik: The 8 requirements of real-time stream processing. SIGMOD Record 34(4): 42-47 (2005).

Grosof, B., Horrocks, I., Volz, R., Decker, S.: Description logic programs: combining logic programs with description logic. In: WWW'03. 48-57.

Sirin, E., Parsia, B.: Planning for Semantic Web Services. In: Martin, D., Lara R. Yamaguchi, T. (eds.) Proceedings of the ISWC 2004 Workshop on Semantic Web Services: Preparing to Meet the World of Business Applications, 2004.

European Office Action dated Aug. 18, 2010 in corresponding European Appln. No. 08 807 375.4-2212.

Nokia: "Nokia N95 User guide" Internet Citation, [Online] Aug. 2007, pp. 1-138, XP002498111 Retrieved from the Internet: URL:http://static.tigerdirect.com/pdf/NokiaN95usermanualU.S.pdf [retrieved on Oct. 1, 2008].

"Adobe PDF Security, Understanding and Using Security Features with Adobe Reader and Adobe Acrobat" Internet Citation. [Online] XP003013727 Retrieved from the Internet: URL http://www.adobe.com/products/pdfs/AdobePDFSecurityGuide-c.pdf [retrieve on Jan. 1, 2007].

SV Hashemian, A graph-based approach to web services composition, Proceedings of the 2005 Symposium on Applications and the Internet (SAINT '05), pp. 1-7.

* cited by examiner

METHOD FOR SEMANTIC MODELING OF STREAM PROCESSING COMPONENTS TO ENABLE AUTOMATIC APPLICATION COMPOSITION

GOVERNMENT INTERESTS

This invention was made with Government support under Contract No.: H98230-05-3-0001 awarded by the U.S. Department of Defense. The Government has certain rights in this invention.

RELATED APPLICATIONS

This application is related to: commonly assigned U.S. application entitled "METHOD AND SYSTEM FOR ASSEMBLING INFORMATION PROCESSING APPLICATIONS BASED ON DECLARATIVE SEMANTIC SPECIFICATIONS", Ser. No. 11/695,238, filed concurrently herewith and incorporated by reference herein in its entirety; commonly assigned U.S. application entitled "METHOD AND SYSTEM FOR AUTOMATICALLY ASSEMBLING STREAM PROCESSING GRAPHS IN STREAM PROCESSING SYSTEMS", Ser. No. 11/695,487, filed concurrently herewith and incorporated by reference herein in its entirety; commonly assigned U.S. application entitled "METHOD FOR DECLARATIVE SEMANTIC EXPRESSION OF USER INTENT TO ENABLE GOAL-DRIVEN STREAM PROCESSING", Ser. No. 11/695,430, filed concurrently herewith and incorporated by reference herein in its entirety; commonly assigned U.S. application entitled "METHOD AND SYSTEM FOR AUTOMATICALLY ASSEMBLING PROCESSING GRAPHS IN INFORMATION PROCESSING SYSTEMS", Ser. No. 11/695,349, filed concurrently herewith and incorporated by reference herein in its entirety; commonly assigned U.S. application entitled "METHOD FOR MODELING COMPONENTS OF AN INFORMATION PROCESSING APPLICATION USING SEMANTIC GRAPH TRANSFORMATIONS", Ser. No. 11/695,311, filed concurrently herewith and incorporated by reference herein in its entirety; commonly assigned U.S. application entitled "METHOD FOR DECLARATIVE SEMANTIC EXPRESSION OF USER INTENT TO ENABLE GOAL-DRIVEN INFORMATION PROCESSING", Ser. No. 11/695,279, filed concurrently herewith and incorporated by reference herein in its entirety; and commonly assigned U.S. application entitled "METHOD AND SYSTEM FOR COMPOSING STREAM PROCESSING APPLICATIONS ACCORDING TO A SEMANTIC DESCRIPTION OF A PROCESSING GOAL", Ser. No. 11/695,410, filed concurrently herewith and incorporated by reference herein in its entirety.

BACKGROUND OF THE INVENTION

1. Technical Field

The present invention relates to modeling components of a stream processing application, and more particularly, to a method for semantic modeling of stream processing components to enable automatic application composition.

2. Discussion of the Related Art

Stream processing applications ingest large volumes of streaming data from one or more sources, process it using a variety of components, and produce results that satisfy user queries.

Stream processing systems are needed in situations where source data is too voluminous to store and analyze. Such data, observed on high capacity streams, must be processed on-the-fly by stream processing applications in response to user queries. These applications are typically expressed as processing graphs (or workflows) of components that can extract meaningful information from mostly unstructured, streaming data. A processing graph is a stream-interconnected collection of data sources and processing elements (PEs). Data sources produce the (possibly unstructured) streaming data to be observed. PEs are deployable software components that can perform various kinds of operations on the data to produce new, derived data streams.

A key challenge for stream processing systems lies in the construction of processing graphs that can satisfy user queries. With many thousands of disparate data sources and PEs to choose from, we cannot expect the end-user to craft these graphs manually. These users are typically not skilled programmers, and they may not have knowledge of the functions performed by different components.

We can also not rely on programmers or experts to construct these graphs. With the large numbers of data sources and PEs to consider, the number of possible graphs is enormous. Different users can have different queries, requiring different graphs to be constructed. Thus, it is not feasible to pre-construct all possible graphs to satisfy the wide variety of end-user queries manually.

Also, for a given query, a number of alternative processing graphs can be assembled, each achieving a similar result, each consuming possibly different amounts of computational resources, and each producing different levels of quality. Depending on deployment-time resource utilization, a particular graph may not be deployable, but some alternate graph, consuming fewer resources at some sacrifice in result quality, might be deployable. Typically, however, users will not know how to construct the right graph to produce the highest quality result with resource limitations at deployment time.

SUMMARY OF THE INVENTION

In an exemplary embodiment of the present invention, a method for modeling components of a stream processing application, comprises: defining an input message pattern of a processing element, wherein the input message pattern includes variables representing data objects that must be included in a message input to the processing element, and a graph pattern that semantically describes the data objects that must be included in the message input to the processing element; and defining, an output message pattern of the processing element, wherein the output message patter includes variables and new data objects, the variables and new data objects representing data objects that must be included in a message output from the processing element, and a graph pattern that semantically describes the data objects in the message output from the processing element.

The graph pattern that semantically describes the data objects that must be included in the message input to the processing element uses terms defined in ontologies represented in Web Ontology Language (OWL). The graph pattern that semantically describes the data objects in the message output from the processing element uses terms defined in ontologies represent in OWL.

The method further comprises defining a set of variables that represent configuration parameters of the processing element. The method further comprises: inputting a plurality of modeled processing element descriptions, each processing element description having a defined input and output message pattern and defined configuration; inputting a processing request, wherein the processing request includes a goal that is represented by a graph pattern that semantically describes a desired processing outcome; and assembling a processing graph that produces a stream that satisfies the desired processing outcome.

Assembling the processing graph comprises matching a message output from a first processing element to an input message pattern of a second processing element if the message includes the data objects that must be included in a message input to the second processing element and if a graph that semantically describes data objects in the message satisfies the graph pattern that semantically describes the data objects that must be included in the message input to the second processing element.

The method further comprises connecting the first processing element to the second processing element when the message is matched to the input message pattern of the second processing element.

The method further comprises generating an output message of the second processing element by applying differences between the graph pattern that semantically describes the data objects that must be included in the message input to the second processing element and the graph pattern that semantically describes the data objects produced as output by the second processing element to the graph that semantically describes the data objects in the message based on a graph transformation operation.

The method further comprises defining an output message pattern of a data source, wherein the output message includes exemplar terms, the exemplar terms representing data objects that must be included in a message output from the data source, and a graph that semantically describes the data objects in the message output from the data source.

The graph that semantically describes the data objects in the message output from the data source is formed by OWL assertions.

The method further comprises: inputting a plurality of modeled processing element descriptions, each processing element description having a defined input and output message pattern; inputting a plurality of data source descriptions, each data source description having a defined output message pattern; inputting a processing request, wherein the processing request includes a goal that is represented by a graph pattern that semantically describes a desired processing outcome; and assembling a processing graph that includes at least one of the modeled processing elements or at least one of the modeled data sources that produces output messages that satisfy the desired processing outcome.

Assembling the processing graph comprises matching a message output from a data source to an input message pattern of a processing element if the message includes the data objects that must be included in a message input to the processing element and if a graph that semantically describes data objects in the message satisfies the graph pattern that semantically describes the data objects that must be included in the message input to the processing element.

The method further comprises connecting the data source to the processing element when the message is matched to the input message pattern of the processing element.

The method further comprises generating an output message of the processing element by applying differences between the graph that semantically describes data objects in the message and the graph pattern that semantically describes the data objects that must be included in the message input to the processing element to the graph pattern that semantically describes the data objects in the message output from the processing element based on a graph transformation operation.

In an exemplary embodiment of the present invention, a system for modeling components of a stream processing application, comprises: a memory device for storing a program; a processor in communication with the memory device, the processor operative with the program to: define an input message pattern of a processing element, wherein the input message pattern includes variables representing data objects that must be included in a message input to the processing element, and a graph pattern that semantically describes the data objects that must be included in the message input to the processing element; and define an output message pattern of the processing element, wherein the output message pattern includes variables and new data objects, the variables and new data objects representing data objects that must be included in a message output from the processing element, and a graph pattern that semantically describes the data objects in the message output from the processing element.

The graph pattern that semantically describes the data objects that must be included in the message input to the processing element uses terms defined in ontologies represented in OWL. The graph pattern that semantically describes the data objects in the message output from the processing element uses terms defined in ontologies represent in OWL.

The processor is further operative with the program to define a set of variables that represent configuration parameters of the processing element. The processor is further operative with the program to: receive a plurality of modeled processing element descriptions, each processing element description having a defined input and output message pattern and defined configuration; receive a processing request, wherein the processing request includes a goal that is represented by a graph pattern that semantically describes a desired processing outcome; and assemble a processing graph that produces a stream that satisfies the desired processing outcome.

When assembling the processing graph the processor is further operative with the program to: match a message output from a first processing element to an input message pattern of a second processing element if the message includes the data objects that must be included in a message input to the second processing element and if a graph that semantically describes data objects in the message satisfies the graph pattern that semantically describes the data objects that must be included in the message input to the second processing element.

The processor is further operative with the program to connect the first processing element to the second processing element when the message is matched to the input message pattern of the second processing element.

The processor is further operative with the program to generate an output message of the second processing element by applying differences between the graph pattern that semantically describes the data objects that must be included in the message input to the second processing element and the graph pattern that semantically describes the data objects produced as output by the second processing element to the graph that semantically describes the data objects in the message based on a graph transformation operation.

The processor is further operative with the program to define an output message pattern of a data source, wherein the output message includes exemplar terms, the exemplar terms representing data objects that must be included in a message output from the data source, and a graph that semantically describes the data objects in the message output from the data source.

The graph that semantically describes the data objects in the message output from the data source is formed by OWL assertions.

The processor is further operative with the program to: receive a plurality of modeled processing element descriptions, each processing element description having a defined input and output message pattern; receive a plurality of data source descriptions, each data source description having a defined output message pattern receive a processing request, wherein the processing request includes a goal that is represented by a graph pattern that semantically describes a desired processing outcome; and assemble a processing graph that includes at least one of the modeled processing elements or at least one of the modeled data sources that produces output messages that satisfy the desired processing outcome.

When assembling the processing graph the processor is further operative with the program to match a message output from a data source to an input message pattern of a processing element if the message includes the data objects that must be included in a message input to the processing element and if a graph that semantically describes data objects in the message satisfies the graph pattern that semantically describes the data objects that must be included in the message input to the processing element.

The processor is further operative with the program to connect the data source to the processing element when the message is matched to the input message pattern of the processing element.

The processor is further operative with the program to generate an output message of the processing element by applying differences between the graph that semantically describes data objects in the message and the graph pattern that semantically describes the data objects that must be included in the message input to the processing element to the graph pattern that semantically describes the data objects in the message output from the processing element based on a graph transformation operation.

In an exemplary embodiment of the present invention, a computer program product comprising a computer useable medium having computer program logic recorded thereon for modeling components of a stream processing application, the computer program logic comprises: program code for defining an input message pattern of a processing element, wherein the input message pattern includes variables representing data objects that must be included in a message input to the processing element, and a graph pattern that semantically describes the data objects that must be included in the message input to the processing element; and program code for defining an output message pattern of the processing element, wherein the output message pattern includes variables and new data objects, the variables and new data objects representing data objects that must be included in a message output from the processing element, and a graph pattern that semantically describes the data objects in the message output from the processing element.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

In accordance with an exemplary embodiment of the present invention, a semantic model is provided that captures the semantics (or meaning) of the data on streams. In this model, streams are described using semantic graphs formed by facts represented in Web Ontology Language (OWL), described in D. McGuinness and F. van Harmelen. OWL web ontology language overview. In W3C Recommendation, 2004, a copy of which is incorporated by reference herein in its entirety. OWL is one of the standard languages of the Semantic Web. This model is used to describe different data sources and processing elements (PEs) in terms of the semantics of the data they consume and produce. Users can also frame queries on the streaming data based on this model. A stream query is represented in the form of a semantic graph pattern that describes the kinds of streams the user is interested in. Data sources are described as producing patterns of streams. All semantic descriptions are based on domain ontologies that define the relevant terms in an area of interest using OWL.

In accordance with another exemplary embodiment of the present invention, by using the semantic model, a method and system for composing processing graphs, automatically, and on-the-fly, whenever a new query is submitted is provided. In order to achieve this automatic composition, a planning algorithm (enhanced to efficiently accommodate the semantic descriptions) that views a stream query as a semantic goal that is to be achieved by composing different data sources and PEs into a processing graph. The planning algorithm constructs optimal graphs that meet the security and privacy constraints. Since OWL is built on Description Logic (DL), the planning algorithm makes use of a class a DL reasoning while constructing optimal graphs.

The system for composing graphs is built on top of the System S Stream Processing Core (SPC), described in N. Jain, L. Amini, H. Andrade, R. King, Y. Park, P. Selo, and C. Venkatramani. Design, implementation, and evaluation of the linear road benchmark on the stream processing core. In SIGMOD'06, June 2006, a copy of which is incorporated by reference herein in its entirety.

System Overview

System Architecture

Figure 1:
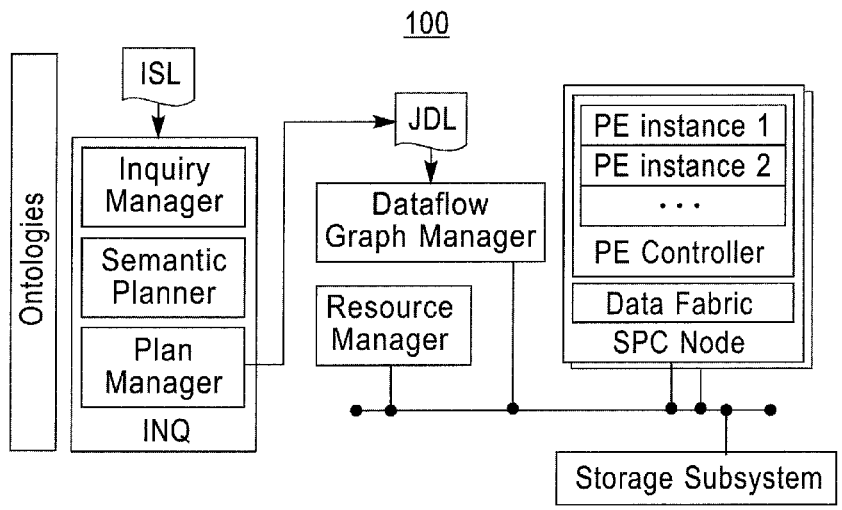
FIG. 1 illustrates a System S Stream Processing Core (SPC) in which an exemplary embodiment of the present invention may be implemented.

The System S 100 (see FIG. 1) is built on the SPC, which is a scalable distributed runtime for stream processing of unstructured data. The SPC provides a set of components that jointly manage deployment and execution of distributed stream processing applications under heavy workload. Application processing graphs submitted to SPC must be described in a Job Description Language (JDL), specifying a set of PE instances to be deployed and the connections between the PEs. Runtime environment on each of the SPC nodes includes Data Fabric for managing data flows and PE Controller that manages execution of PEs deployed on the node. Structured and/or unstructured data is sent between the PEs packaged in stream data object (SDO) format. A Graph Manager component controls I/O channels of the data fabric, and a Resource Manager manages dynamic allocation of PE instances to nodes subject to various resource constraints.

In what follows, INQ will be described, a component of System S responsible for semi-automatic generation of JDL job descriptions based on ontology-supported descriptions of processing goals. Inquiry specifications encoded in ISL and received through Inquiry Manager, are fed to a Semantic Planner, which consults domain ontologies to interpret the inquiry spec and consults domain and system ontologies to match the request to the capabilities of candidate data sources and PEs. Semantic planning is achieved using formal reasoning over the various ontologies and will be discussed later. The processing graphs produced by the planner are then translated into JDL by a Plan Manager, and can submitted for deployment in SPC. Completely automatic composition may not work in all scenarios, and users have the option to review the composed application, and may decide to go back and revise their inquiry.

Application Example

We illustrate the main underlying idea of INQ by an example. Assume that in a company called Enterprise Global Services (EGS), the System S 100 is connected to a private VoIP based telephone network. Following a customary business practice, all callers to EGS phones are warned that the calls may be monitored to ensure quality service. Thanks to VoIP, employees of EGS can travel, and take calls anywhere they can find an Internet connection. The person whose job it is to monitor the quality of service, may be interested in calls made by a specific employee or in location of that employee. These questions can be answered by a stream processing application 200 schematically shown in FIG. 2.

Figure 2:
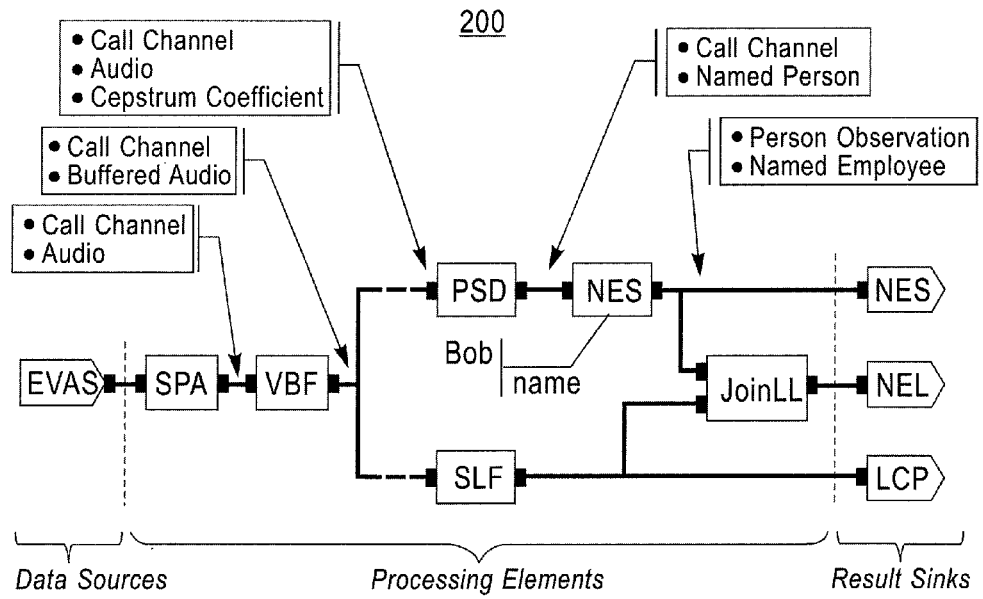
FIG. 2 illustrates a stream processing graph according to an exemplary embodiment of the present invention.

In FIG. 2, a single SourcePE (EVAS) is connected to EGS VoIP network, and streams out VoIP packets, packaging them as SDOs. A number of PEs process the information, and eventually output three result streams via corresponding SinkPE. NES sink produces alerts when employee Bob makes a call, NEL sink produces the same alerts, but also provides information on the location of Bob (based on his IP address), and finally LCP sink streams out information on the location of all employees currently making calls. Different implementations of SinkPEs can be used with the same data to provide different types of result disposition, for example, store the results in a database, or stream notifications to user's console.

We have not included all PEs required in our implementation of this processing graph, but the main PEs are shown. SPA and VBF carry out simple preliminary analysis of VoIP streams at a high rate, removing noise. PSD can detect speaker names using voice signatures of EGS employees. NES is a filtering PE, configured to select only calls of the employee named Bob. SLF looks up the geographic location of a caller based on the IP address, and JoinLL computes a window join between the streams of identified speakers and caller locations.

The graph 200 in FIG. 2 shows the result of overlaying three separate inquiries. Rather than developing three disconnected graphs, and including a new copy of the EVAS-SPA-VBF chain in all three, the System S 100 can overlay the graphs and reuse partially processed results.

At a high-level the process of composing such an application can be described informally as follows. Given an inquiry "where is Bob", the planner will look for a PE that can provide location of employee "Bob", treating "Bob" as a literal. JoinLL PE can do that, and it requires two input streams, one carrying speakers identified as "Bob", and another carrying location information. NES can provide speakers named "Bob", if it receives a stream of identified speakers, and has configuration parameter "name" set to "Bob". This search continues until a processing graph (similar to the graph 200 shown on FIG. 2) is built, where all input requirements of all PEs are satisfied.

To implement this approach, the Semantic Planner uses descriptions of PEs, sources and inquiries expressed in OWL, and makes use of OWL-DL, reasoning to compare the requirements of PEs and inquiries to streams produced by other PEs and sources. In particular, ontologies and reasoning help make the connection between the user's terms and the system's terms, for example match "where is . . . " goal to a stream carrying "geographic location of phone call". When more than one alternative stream can satisfy an input requirement, the planner evaluates all possible alternatives, rejecting those that violate various operational constraints and selecting optimal graphs from the remaining alternatives.

Ontologies and Semantic Planning

The Semantic Planner creates the plans based on the descriptions of PEs and data sources represented in OWL. These descriptions directly affect the output of the planner, and therefore significantly impact how the system reacts to user's requests, and what kinds of requests are supported. Hence, the process of describing the semantics of PEs and becomes a part of the software engineering process in the System S 100. We refer to this process as ontology engineering, to emphasize that we are talking about writing semantic descriptions, not programs. While this new process introduces additional complexity and increases the costs of developing applications, we argue that in large systems the advantages achieved in separating PE and source development from the formulation of inquiries outweighs such concerns. This provides a rough equivalent of making database queries independent of the database schema and stored procedures, via a mapping supported by extensible ontologies.

INQ, and ISL in particular, provides a bridge between the users' understanding of processing goals and the specific application configurations deployable in SPC.

In the past few years, the growth of the Semantic Web has resulted in a number of different models and languages for representing and reasoning about knowledge. A number of tools have also been developed to aid the specification of ontologies, as well as perform reasoning on the ontologies. A number of ontologies have been developed in various domains, such as bioinformatics and medical research. Thus, it is becoming increasingly easier to leverage these powerful technologies in managing data. New tools developed in the future will further help in managing large ontologies.

Advantages of a Semantic Model

There are a number of different data models that can be used for describing stream queries and stream system components. These include keyword based models, relational models, object oriented models, etc. The main reason for choosing a semantic graph based model is that it is highly expressive and supports the use powerful reasoning mechanisms during composition.

Semantic models are especially useful for describing arbitrary operations on data in a formal manner and then build a plan automatically that uses these operations Relational algebra (and its extensions) is very well suited for describing relational and time-windowed operations on streaming data. However, they are not as useful for describing arbitrary operations (such as annotation, classification, transformation, etc.) on different kinds of structured, semi-structured or unstructured data in different formats (including text, audio, video, etc.). Although SQL has user-defined functions that can perform arbitrary analysis of data, these functions have to be explicitly declared by users in their SQL queries. So, the people writing SQL queries need to have expert knowledge on the functions and on the different tables. This approach does not scale well when the set of possible operations is huge and dynamically changing.

Since PEs can perform arbitrary processing on the data, they must have a semantic model that allows them to be composed. We describe the PEs using graph transformation approaches. That is, the inputs to a PE are described in terms of graph patterns that describe the kinds of input streams they can handle, and outputs are described in terms of graph patterns that describe the kinds of output streams they produce. This is more expressive and has a basis in formal description logic. It is also very powerful, since DL reasoning can be used to match components; hence, components can be matched to one another even if they use different terms and graph structures. Our main hypothesis is that we can capture enough of the PE's behavior in terms of these graph transformations so as to construct processing graphs using them in an automatic manner.

In the past few years, the growth of the Semantic Web has resulted in a number of different models and languages for representing and reasoning about knowledge. A number of tools have also been developed to aid the specification of ontologies, as well as perform reasoning on the ontologies. A number of ontologies have been developed in various domains, such as bioinformatics and medical research. Thus, it is becoming increasingly easier to leverage these powerful technologies in managing data. New tools developed in the future will further help in managing large ontologies.

Semantic Descriptions of Streams

Stream

A stream carries of zero or more data objects, called Stream Data Objects (SDOs). Each SDO is associated with a timestamp. In addition, a stream is associated with metadata that is described semantically, using a graph described in OWL, a standard language of the Semantic Web. This semantic description of the stream provides rich information about the meaning of the data on the stream, together with its format.

Formally, a Stream S is a 2-tuple (Sem, <SDO, $\tau$>), where Sem is the semantic description of the stream. <SDO, $\tau$> represents a multiset of stream data objects (SDO), each of which is associated a with timestamp, $\tau \in T$. T represents a discrete, ordered time domain. A time instant, $\tau$ is any value from T. The semantics of each SDO is based on Sem.

Ontologies

The basis of semantic descriptions of streams are ontologies. Ontologies are formal descriptions of the kinds of entities there are and how they are related. Here, we use ontologies specified in OWL, which is based on RDF. OWL is emerging as a standard Semantic Web language for describing ontologies and is based on Description Logics (DL). OWL ontologies describe concepts (or classes), properties and individuals (or instances) relevant to a domain of interest.

Description Logic (DL) is typically used to represent and reason about the terminological knowledge of an application domain. In DLs, there are two kinds of facts: "TBox" (terminological box) and "ABox" (assertion box). In general, the TBox contains sentences describing concepts and properties. For instance, it describes concept hierarchies and the domains and ranges of properties. The ABox contains "ground" sentences describing individuals (or instances). For instance, it describes which concepts an individual belongs to as well as the values of any properties defined on the individual. OWL ontologies may be described as RDF graphs. We assume that there is a common set of ontologies, on which all stream descriptions, PE and data source descriptions and inquiry goals are based. This allows us to compose stream processing applications that satisfy user goals, without having to worry about the tough problem of mapping or integrating heterogeneous ontologies.

Example ontologies are TBox and ABox, EGIS ontology.

Preliminary Definitions from RDF and OWL

RDF Term. Let U be the set of all URIs. Let $RDF_L$ be the set of all RDF Literals (which are data values, that may be typed). The set of RDF Terms, $RDF_T$, is $U \cup RDF_L$.

Note that RDF also defines blank nodes, which are unique nodes that can be used in one or more RDF statements, but have no intrinsic name or URI. In our model of streams, we do not consider blank nodes; however, the model can be easily extended with blank nodes.

RDF Triple. An RDF triple contains three components:
1. the subject, which is an RDF URI reference or a blank node
2. the predicate, which is an RDF URI reference. The predicate is also known as the property of the triple.
3. the object, which is an RDF URI reference or a literal.

An RDF triple is conventionally written in the form (subject predicate object). An example of a triple is (Earth locatedIn SolarSystem).

An RDF triple may be defined as a member of the set: $U \times U \times RDF_T$.

RDF Graph. An RDF graph is a set of RDF triples. The set of nodes of an RDF graph is the set of subjects and objects of triples in the graph. The edges are labeled by the properties.

OWL Axiom. An OWL Axiom is a sentence in the TBox of an ontology that gives information about classes and properties. This information includes subclass and subproperty relationships, whether a certain property is transitive, symmetric or functional, or the inverse of another property, restrictions on the values of a property, etc. An OWL Axiom may be represented as an RDF triple. An example is (Planet rdfs: subClassOf HeavenlyBody), which describes how the concepts Planet and HeavenlyBody relate to each other.

OWL Fact. An OWL fact is an ABox assertion that states information about a particular individual, in the form of classes that the individual belongs to plus properties and values of that individual. An OWL fact may be represented as an RDF triple. An example is (Earth rdf:type Planet), which describes the individual Earth as belonging to the concept Planet.

Semantic Description of a Stream

Each stream is associated with a semantic description, Sem. This description is represented as a special kind of semantic graph that captures the semantics of the data in a typical (or exemplar) SDO in the stream. The semantic description describes the data present in the SDO and any constraints that are satisfied by the data in terms of a graph of OWL facts.

Exemplar Individual. In order to describe the semantics of a stream, we introduce the notion of an exemplar individual, which is a special kind of OWL individual. An exemplar individual is a member of the set $E_I$ where $E_I$ is infinite and $E_I \subset U$. An exemplar individual represents an existentially quantified variable, whose value belongs to the set of regular (or nonexemplar) individuals, i.e., who's value belongs to $U-E_I$. For the purpose of representation in an OWL ontology, we describe the exemplar individual as an OWL individual that belongs to a special concept called Exemplar individual.

standard RDF predicate that indicates that the subject, _x, is an individual that is of type (Person), which may be an OWL concept. Different SDOs in a stream may replace _x with different values (such as John or Mary). However, any values that _x is replaced by must satisfy the condition that it's type is the OWL concept, Person.

Stream-Graph. A Stream-Graph is one of:
Basic Stream-Graph
Stream-Value Constraints
Union Stream-Graph.
Basic Stream-Graph A Basic Stream-Graph is a set of Stream-Triples, as depicted below in RDF N3 format, described in T. Berners-Lee, Notation 3. Technical report, a copy of which is incorporated by reference herein in its entirety:

```
BSG1 = {
    :___VoIP__AudioSegment__1    rdf:type         :VoIP__AudioSegment;
                                 :conveyedVia     ___VoIP CallChannel__1;
                                 :hasStart        :___StartTime^^xs:Time;
                                 :hasDuration     :___Duration^^xs:Duration.
    :___VoIP__CallChannel__1     rdf:type         :VoIP__CallChannel.
}
```

Stream-Value Constraint. A value constraint is a boolean-valued expression of exemplar individuals and RDF Terms. An example is:

SVC1={(Duration="PT0.5S"^^xs:duration")}

Union Stream-Graph. A Union Stream-Graph is a set of Stream-Graphs. An example is:

```
USG1 = BSG1 [ SVC1 = {
    :___VoIP__AudioSegment__1    rdf:type         :VoIP__AudioSegment ;
                                 :conveyedVia     :VoIP__CallChannel ;
                                 :hasStart        :___StartTime ;
                                 :hasDuration     :___Duration .
    :___Duration                 =                "PT0.5S"^^xs:duration" .
}
```

Exemplar Literal. An exemplar literal is a member of the set $E_L$ where $E_L$ is infinite and $E_L \subset RDF_L$. An exemplar literal represents an existentially quantified variable, whose value belongs to the set of regular (or non-exemplar) literals, i.e., who's value belongs to $RDF_L-E_L$.

For the purpose of representation in an OWL ontology, we define an exemplar literal to have a special xsd type called xsd:exemplar. In this paper, we represent all exemplar individuals and literals with a preceding _.

The semantic description of a stream is expressed in terms of exemplar individuals and exemplar literals. Exemplar individuals may be associated with a number of constraints in the semantic description of the stream. For example, the constraints on exemplar individuals include the classes they belong to and values of various properties. Different SDOs in the stream may replace the exemplar individuals and literals with regular (or non-exemplar) individuals and literals. The replacement regular individuals and literals must obey all the constraints that are associated with the exemplars.

Stream-Triple. A stream-triple is an OWL fact that is a member of the set: $(U \cup E_I) \times (U) \times (RDF_T \cup E_I \cup E_L)$, where either the subject is an exemplar individual or the object is an exemplar individual or an exemplar literal. An example of a streamtriple is (x rdf:type Person). Note that rdf:type is a Semantic Description of a Stream. The semantic description of a stream describes the data present in a typical SDO (on the stream) and any constraints on the data, expressed using a graph of OWL facts. The semantic description of a stream is a 3-tuple of the form (SN, SD, SG) where a SN is the name of the stream. The stream name is represented as a URI, i.e., $SN \in U$ SD is the set of data items contained in the typical SDO in the stream. The data in the typical SDO is represented as exemplar individuals and exemplar literals. That is, $SD \in 2^{E_I \cup E_L}$ SG is the stream graph that describes the semantics of the data on the typical SDO in the stream. The stream graph describes the constraints associated with all the exemplar individuals and exemplar literals that are contained in the stream.

For each data time, d in the typical SDO, (d∈SD), there must exist a stream-triple in SG that associates d with a format. The actual value of the format depends on the application and the stream-system under consideration. The format may be described in different ways such as a type in a programming language like C or Java, an element in an XML schema, an encoding format (such as text, jpg or mpeg), an attribute of a tuple, etc., where d is either the subject or the object.

We represent the semantic description of a stream using OWL facts and value constraints. An example of a stream is the VoIP_AudioSegmentStream which contains the exemplar individual _VoIP_AudioSegment_1, which is further described by the stream graph, USG1. The stream is represented as follows:

```
:VoIP_AudioSegmentStream
    rdf:type              :Stream ;
    contains              :___VoIP_AudioSegment_1 .
:___VoIP_AudioSegment_1
    rdf:type              :VoIP_AudioSegment ;
    :conveyedVia          :___VoIP_CallChannel_1 ;
    :hasStart             :___StartTime^xs:time ;
    :hasDuration          :___Duration^xs:duration ;
    :hasFormat "com.ibm.system s.DIG.RTP"^xs:ncname .
```

In the above description, the stream contains an exemplar individual called: _VoIP_AudioSegment_1. In other words, all the SDOs in the stream contain an element that satisfies all the constraints described on: _VoIP_AudioSegment_1.

Figure 3:
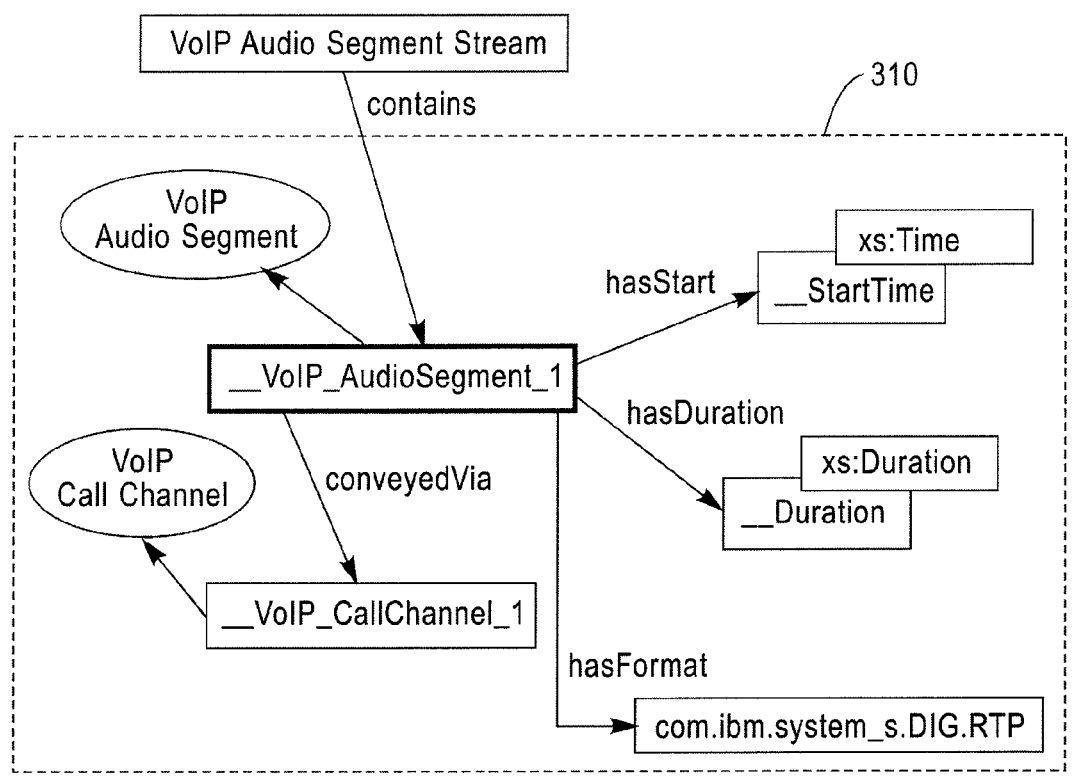
FIG. 3 illustrates a stream described using a semantic graph according to an exemplary embodiment of the present invention.

The stream graph, USG1, describes the constraints on: _VoIP_AudioSegment_1. It states that: _VoIP_AudioSegment_1 is of type: VoIP_AudioSegment, and also states constraints on certain properties of: _VoIP_AudioSegment_1. FIG. 3 shows the description as a graph 310.

Also, note that a stream description only contains OWL facts, i.e., assertions about different individuals (exemplar and regular) and how they are related. It does not contain OWL TBox axioms, i.e., it does not define new concepts or properties, or extend the definitions of existing concepts and properties. A stream description only uses concepts and properties defined in the ontology. In the above example, the ontology defines different concepts like InfraredImage, Image, etc., and different properties like imageOf. In addition, it defines some individuals like Earth and Hubble.

An important point is that Hubble, Earth and _c do not really appear in the stream; they are semantic descriptions of the _VoIP_AudioSegment_1 data, which appears in the stream. Hence, the contains relation is a special one: only those data items that the stream explicitly says it contains are actually in the stream. The rest of the graph forms a rich semantic description of what the stream contains.

Ground Instance of a Basic Stream-Graph. Exemplar individuals and literals in a basic stream-graph act as existentially quantified variables. Hence, they may be replaced by regular, non-exemplar individuals or literals.

Let M be a mapping from a set of exemplar individuals and literals to some set of non-exemplar individuals and literals. Then the graph obtained from a basic stream-graph, G by replacing all of the exemplar individuals and literals, e, in G by M(e) is a ground instance of G. This ground instance is represented by M(G).

Structure of an SDO in the stream. Each SDO in a stream may also be described as a semantic graph. The semantic descriptions of the SDO is derived from the semantic description of the stream, after replacing all exemplar individuals and literals by regular (non-exemplar) individuals and literals.

An SDO is a 4-tuple of the form (ID, Stream, $SDO_D$, $SDO_G$ such that
   ID is a string that is a unique identifier for the SDO.
   Stream refers to the semantic description of the stream that the SDO is in. Stream is a 3-tuple of the form (SN, SD, SG). SG consists of a basic stream-graph, BSG, and a set of value constraints, VC.

$SDO_D$ is the set of regular individuals and literals that represent the data items contained in the SDO. That is, $SDO_D \in 2^{(U \cup RDF_L) - (E_I \cup)E_L}$. These data elements are explicitly contained and indexed by the stream; so a PE can directly access these elements.

$SDO_G$ is an RDF graph, containing OWL facts, that describes the semantics of the data in the SDO. The graph describes the constraints associated with all data items in the SDO.

There exists a mapping, M from the set of exemplar individuals and literals to the set of non-exemplar individuals and literals such that
$\forall e, (e \in SD) \Rightarrow (M(e) \in SDO_D)$. That is, the SDO must contain at least those data items that are present in the typical SDO as defined in the stream description. The format of the data elements present in the SDO is as declared for the corresponding exemplar in the stream description.

M(BSG) is a ground instance of BSG and M(BSG) is a subgraph of $SDO_G$. That is, the semantics associated with the data items in the SDO must be at least what is associated with the exemplars in the typical SDO, as defined in the stream description.

For every value constraint $c \in VC$, where VC is the set of value constraints on exemplar literals in SG, M(c) is true, where M(c) is the Boolean-valued expression obtained by substitution of the exemplar literals in c by regular literals.

In the above example, different SDOs in the stream might have different images in place of the exemplar _VoIP_Audio-Segment_1, and different times in place of the exemplar _StartTime. However, all the images in the SDOs satisfy the different conditions described in USG1, viz. that it is of type InfraredImage, it is an image of Earth, etc. In a specific SDO, all the exemplar individuals and literals are replaced by regular individuals and literals. For example, a specific SDO may contain a specific image, say image123 with 64 colors. This specific image obeys all the constraints described on _VoIP_AudioSegment_1, e.g.,
{(image123 rdf:type InfraredImage),
(image123 imageOf Earth), (image123 numberColors 64)
   (image123 capturedBy Hubble)}

Format of a Stream

While all streams have a semantic description based on stream-graphs, they do not necessarily carry data in the form of such graphs. For purposes of efficiency and performance, the stream data objects may be formatted using other models. Examples of models used for representing the format of the data on the stream are keywords, attribute value pairs, types, structures in a programming language (like C or Java), encoding formats (like jpg, etc.) and relations (or tuples).

The separation of the semantic model of a stream and the actual format of the data on the stream is a key element of our approach. We distinguish the format of the data from the meaning of the data. For purposes of efficiency or compatibility with legacy systems, that actual data on the stream may be formatted in different ways. However, for the purposes of automatic composition of stream processing applications, there needs to be semantic models of streams, which are then used to describe PEs and Data Sources.

Descriptions of Data Sources

A data source is described as producing a single stream. Formally, a data source is a 3-tuple of the form (DSN, SDS, DD) where
   DSN is a URI that represents the name of the Data Source
   SDS is the semantic description of a stream
   DD is an RDF graph consisting only of OWL facts that describe other properties of the data Source not related to the stream it produces. Examples of such properties are location and owner of the source.

Figure 4:
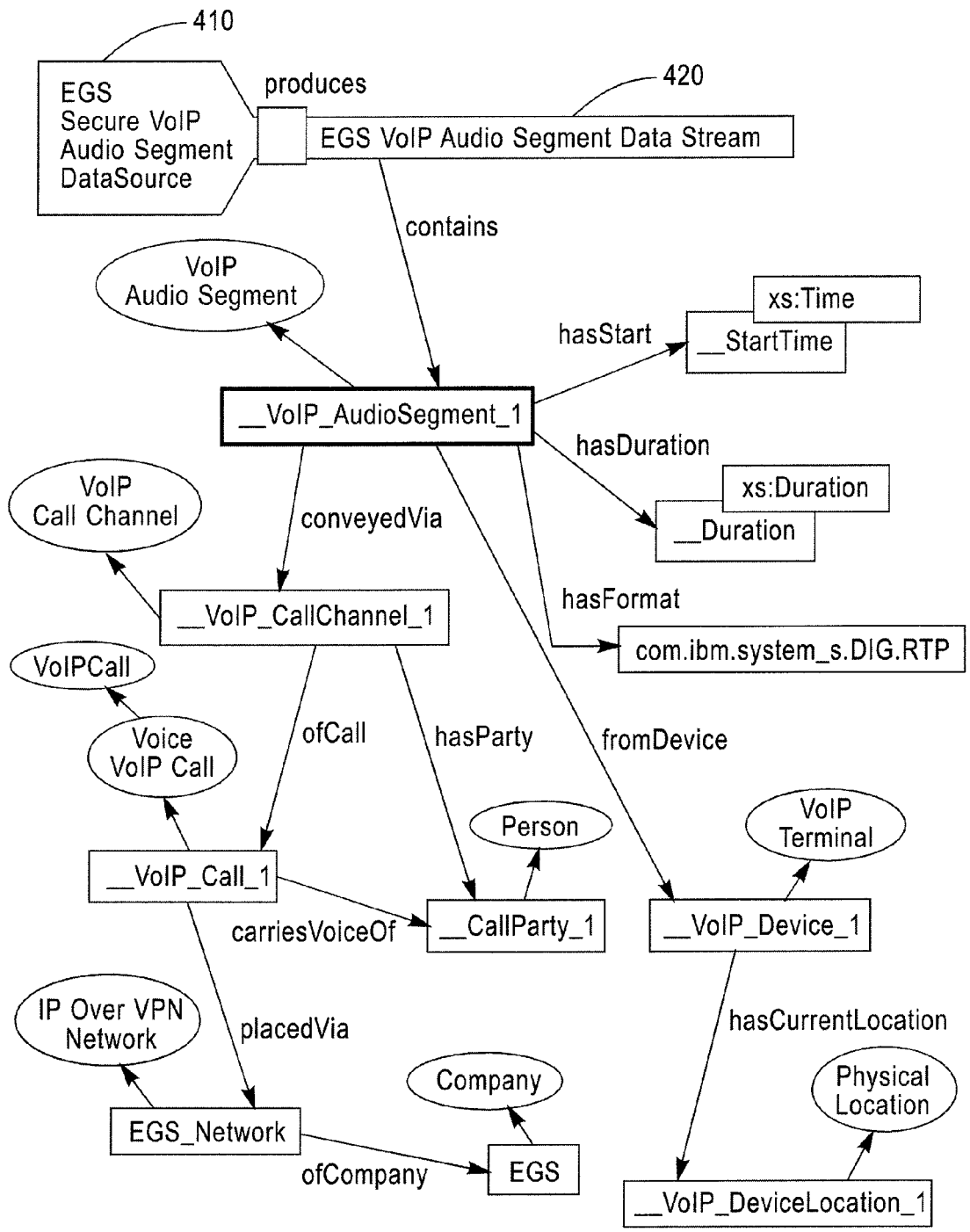
FIG. 4 illustrates a data source semantic description according to an exemplary embodiment of the present invention.

An example Data Source 410 is shown in FIG. 4. This source produces a stream 420 that contains an exemplar called: _VoIP_AudioSegment_1. The semantic graph describes the constraints on: _VoIP_AudioSegment_1. For instance, it states that: _VoIP_AudioSegment_1 is of type: VoIP AudioSegment.

Figure 5:
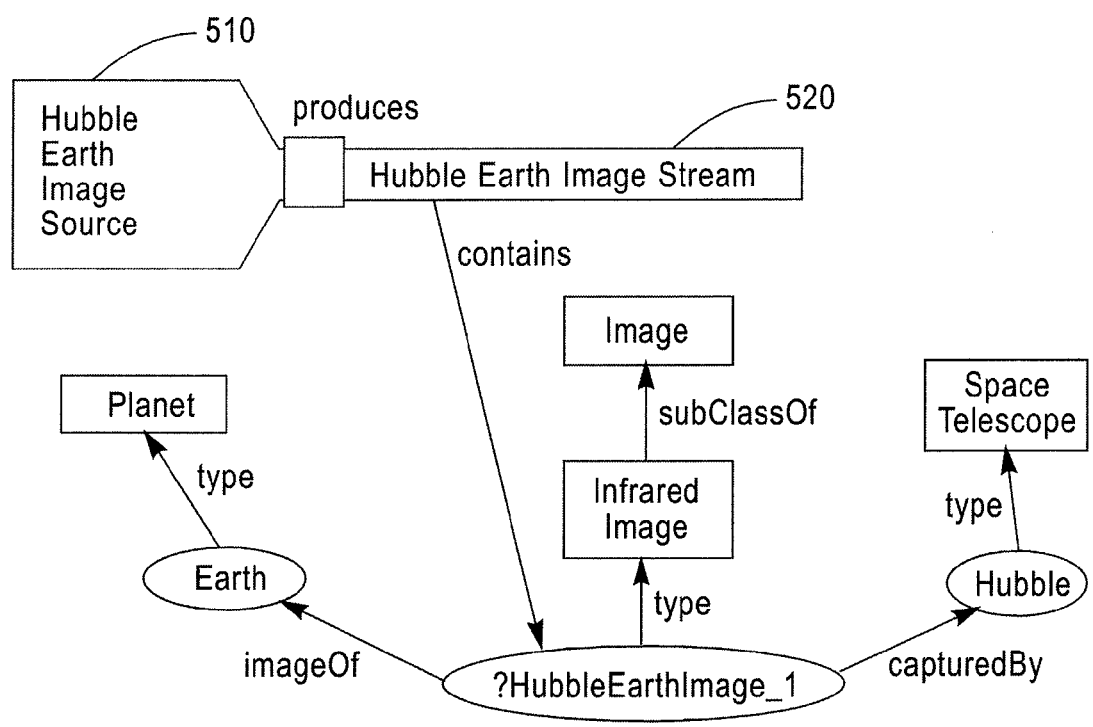
FIG. 5 illustrates a data source semantic description according to an exemplary embodiment of the present invention.

Another example of a Data Source 510 is shown in FIG. 5. The HubbleEarthImageSource produces a stream 520 that contains HubbleEarthImage_1, an individual in the class InfraredImage.

```
:HubbleEarthImageSource
a :DataSource ;
    :produces :HubbleEarthImageStream .
:HubbleEarthImageStream
:contains :HubbleEarthImage_1 .
:HubbleEarthImage_1 a :InfraredImage ;
:imageOf:Earth ;
capturedBy :Hubble ;
a :Variable .
```

Descriptions of PEs

The streams produced by data sources may sometimes satisfy inquiries by themselves. Typically, however, some processing needs to be done on one or more primal streams coming from data sources in order to produce a stream that satisfies an inquiry. This processing is done by one or more PEs laid out in a processing graph. In our system, PEs may be implemented using either Java or C++; they have well defined interfaces describing their inputs and outputs in terms of types in a typesystem (Java or C++).

A PE is represented as an individual of the concept PE and is described as taking in one or more input streams, and producing one or more output streams. In addition, a PE may be associated with other properties like developer, algorithmUsed, etc. The semantic description of a PE contains a description of the kinds of streams it takes in and the kinds of streams it gives out. In order to describe the inputs and outputs, we introduce the notion of a stream-pattern.

Describing a Stream-Pattern

Broadly, a stream-pattern describes an equivalence class of streams. Its description looks similar to the description of a stream, except that certain elements in the description can now be variables.

Variable. A variable is a member of the set V where V is infinite and disjoint from $RDF_T$.

Triple Pattern. A triple pattern is a member of the set: $(U \cup RDF_B \cup V) \times (U) \times (RDF_T \cup V)$.

A triple pattern is an RDF triple, containing a subject, predicate and object, where either the subject or the object is a variable. An example of a triple pattern is (?x imageOf Earth).

Graph Pattern. A Graph Pattern is one of:
Basic Graph Pattern
Union Graph Pattern
Value Constraints Basic Graph Pattern. A Basic Graph Pattern is a set of Triple Patterns. An example is:

```
BGP1 = {( ?EarthImage_1 a :Image;
?EarthImage_1 :imageOf :Earth;
?EarthImage_1 numberColors ?NoColors
```

-continued
```
?EarthImage_1 :containsPattern ?StormPattern.
:Earth a :Planet
?StormPattern_1 a :StormPattern}
```

Value Constraint. A value constraint is a boolean-valued expression of variables and RDF Terms using string-based or numeric relational operators. An example is:

```
VC1={(?NoColors<1024)}
```

Union Graph Pattern. A union graph pattern is a set of graph patterns. An example is:

```
UGP1 = BGP1 [ VC1
= {( ?EarthImage_1 a :Image;
?EarthImage_1 :imageOf :Earth;
?EarthImage_1 :noColors ?NoColors
?EarthImage_1 :containsPattern ?StormPattern.
?StormPattern_1 a :StormPattern
?NoColors < 1024}
```

Stream-Pattern. A stream pattern is a 2-tuple of the form SP(ID, IGP) such that

ID is a set of variables that represents the data that must be contained on any stream matched to it. $ID \in 2^V$ IGP is a graph pattern that describes the semantics of the data on the stream For each variable, v that is contained in the stream (v∈ID), there must exist at least one triple-pattern in IGP where v is either the subject or the object. In other words, IGP must have at least one constraint defined on every variable in ID.

Basic Model of a PE

PEs are described in terms of the kinds of streams they require as input and the kinds of streams they produce as output. They are modeled in terms of graph transformations. The inputs and outputs are described as stream-patterns, which in turn consist of graph patterns. Hence, the basic PE model is that it takes m input graph patterns on its m input streams, processes (or transforms) them in some fashion and produces n output graph patterns on its n output streams. In addition, a PE can have zero or more configuration parameters that can be used to dictate exactly how the PE behaves. Each configuration parameter is represented as a variable literal of a certain type (like xs:string or xs:int).

A PE is a 5-tuple of the form (PN, Params, ISR, OSD, PD) where

PN is a URI that represents name of the PE.

Params is a set of configuration parameters that are described as variable literals.

ISR is a set of input stream requirements, where each input stream requirement is represented as a streampattern. The different stream-patterns may overlap; i.e., the graph patterns they contain may share common nodes and edges. The overlap helps in describing dependencies between the different input stream patterns.

OSD is a set of output stream descriptions, where each output stream description is represented as a stream pattern. They may contain exemplars, especially to signify new kinds of data being created. Again, the different stream-patterns may overlap amongst themselves as well as with the input stream patterns.

The set of variables in OSD is a subset of the set of variables that are described in ISR and Param. This helps ensure that no free variables exist in the output stream description, an essential requirement for the planning process.

PD is an RDF graph consisting only of OWL facts that describe other properties of the PE not related to its input requirements and output production. These properties can include the PE developer, the version number, etc.

Figure 6:
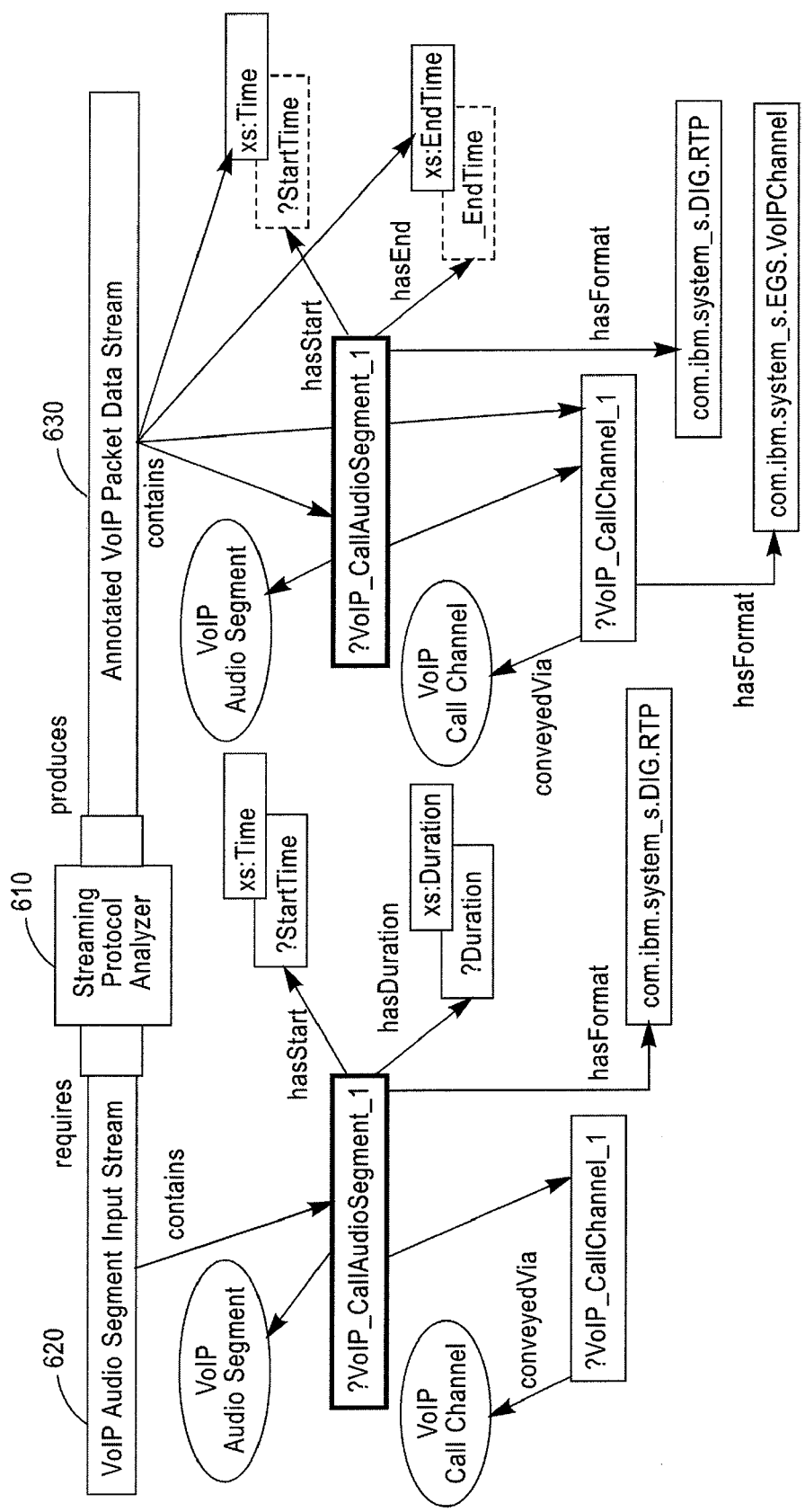
FIG. 6 illustrates a processing element semantic description according to an exemplary embodiment of the present invention.

An example PE 610 is shown in FIG. 6. This PE 610 requires an input stream 620 which contains ?VoIP_CallAudioSegment_1 that is associated with various constraints. The format of ?VoIP_CallAudioSegment_1 is an RTP packet. The PE 610 extracts the start time and call channel information from the incoming RTP packet and computes the end time from the duration. It then puts this information along with the original ?VoIP _CallAudioSegment_1 on the output stream 630.

Figure 7:
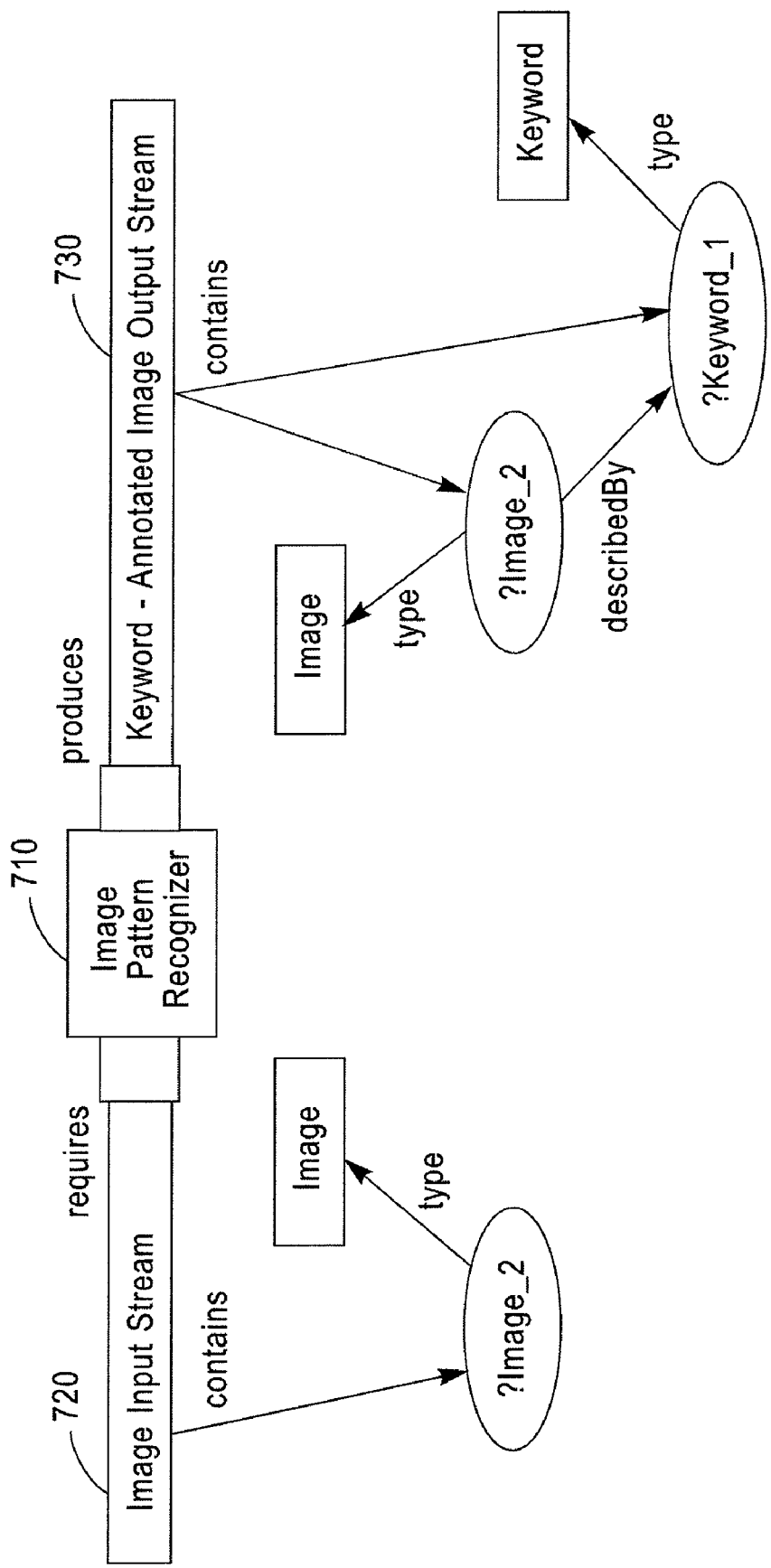
FIG. 7 illustrates a processing element semantic description according to an exemplary embodiment of the present invention.

Another example of another PE 710 is shown in FIG. 7. The ImagePatternRecognizer PE 710 is defined as requiring one stream 720 containing some Image, Image_2, and as producing a single output stream 730 containing Image_2, and a Keyword Keyword_1, such that Image_2 is describedBy Keyword_1. The meaning is that the ImagePatternRecognizer requires as input some Image_2 and produces the same Image_2 as output, annotated by some Keyword_1. The ImagePattern-Recognizer is defined to perform a few functions: it conveys a known Image from input to output, it creates a new object—a Keyword—and it establishes a new relation, describedBy.

The semantic description of a PE gives a general, application independent, description of the kinds of streams and parameters it requires and the kinds of streams it produces. In a given application (or processing graph), a specific set of input streams may be connected to the PE and a specific set of configuration parameters may be given to the PE. As a result, the PE produces a specific set of output streams.

Note that the semantic description of the PE is in terms of streams, and not in the form of individual SDOs. For example, the description does not say how many SDOs a PE takes in on any input stream for producing SDOs on the output stream.

Note that although the PEs inputs, outputs and parameters are described using OWL assertions, that does not mean that the PEs actually take in and produce data in the form of OWL assertions. The data they take in and produce may be in any format (text, image, video, etc.); however, their semantics are as described by these OWL assertions.

Different Kinds of PEs

PEs performing different kinds of functions are classified according to a PE taxonomy, which distinguishes different PEs based on patterns by which the semantics of the output are related to the semantics of the input.

The StreamProtocolAnnotator PE takes in some input data and outputs a copy of the input data, annotated with additional information. As such, the StreamProtocolAnnotator is classified as an Annotator, one of several design patterns that can be described. Annotator PEs are a class of PE that take in some input and produce a stream containing the same content, with some additional annotation. Other types of PEs include Aggregators, Classifiers, DemultiplexorsDemultiplexors, Filters, Joins, and Monitors (as well as SourcePEs and SinkPEs, responsible for, respectively, conditioning data entering and exiting the system).

Figure 8:
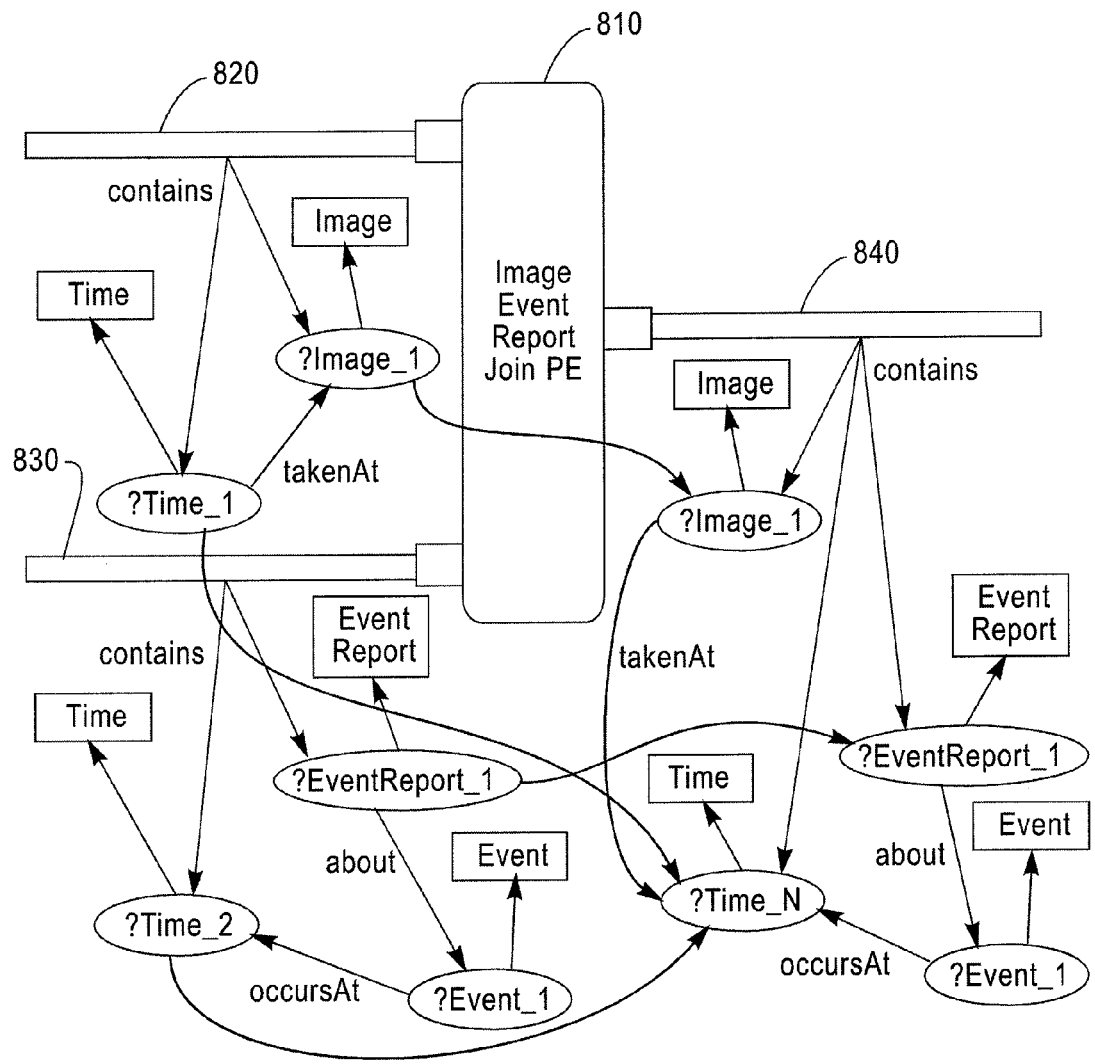
FIG. 8 illustrates a processing element semantic description according to an exemplary embodiment of the present invention.

FIG. 8 depicts an example of a Join PE 810. This PE 810 has two input streams, one containing images taken at a certain time 820 and another containing event reports about events that occur at a certain time 830. The PE 810 joins images to event reports based on the time and produces an output stream 840 carrying the product of the join operation. Because this is a black box description, the specific details of how the join occurs and the relationship among the three time entities are not formally described and thus do not directly influence component assembly.

Similarly, other kinds PEs with different behaviors can be represented.

Putting the PE in a Specific Context

The semantic description of a PE gives a general, application independent, description of the kinds of streams and parameters it takes in and the kinds of streams it gives out. In a given application (or processing graph), a specific set of input streams may be connected to the PE and a specific set of configuration parameters may be given to the PE. As a result, the PE produces a specific set of output streams.

In order to connect an input stream to a PE, we need to be able to match the stream to the stream-pattern describing the PE's input requirement. Based on this match, we describe the conditions for connecting a specific set of input streams to the PE and instantiating the PE with a specific set of configuration parameters. We also describe the method for calculating the description of the specific output streams the PE produces.

Matching a Stream to a Stream-Pattern. A stream matches a stream-pattern if and only if all the conditions (or constraints) in the stream-pattern are satisfied by the stream. We now describe what is required for a stream to match a stream-pattern.

In order to define a match, we first define the notion of a pattern solution, which expresses a substitution of the variables in a stream pattern. We then define the conditions for a match in terms of the existence of an appropriate pattern solution.

Pattern Solution. A pattern solution is a substitution function ($\theta: V \rightarrow RDF_T$) from the set of variables in a graph pattern to the set of RDF terms. Variables may also be mapped to exemplar individuals and exemplar literals. For example, one possible definition of $\theta$ for the graph pattern, UGP1 is: $\theta$(?Earthimage_1)=hei, $\theta$(?StormPattern_1)=TropicalStorm, $\theta$(?NoColors)=_c.

The result of replacing a variable, v is represented by $\theta(v)$. The result of replacing all the variables in a graph pattern, GP, is written as $\theta(GP)$.

Condition for match. Consider a stream-pattern SP(SV, GP), and a stream, S(SN, SD, SG). GP can be considered to be the union of a basic graph pattern, BGP and a set of value constraints VC. SG can be considered to be the union of a basic stream-graph, BSG and a set of stream-value constraints SVC. We define the stream-pattern, SP to be matched by the stream, S, based on an ontology, O, if and only if there exists a pattern solution, $\theta$, defined on all the variables in GP, such that following conditions hold:

- $\theta(SV) \subseteq SD$, i.e. the stream contains at least those elements that the pattern says it must contain.
- $BSG \cup O \models_E \theta(BGP)$ where O is the common ontology, and $\models_E$ is an entailment relation defined between RDF graphs. For instance, E may be RDF, RDFS, OWL-Lite, OWL-DL, etc. In other words, we try to see if it is possible to infer the substituted graph pattern from the stream-graph according to some well defined logical reasoning framework.
- For any value constraint $c \in VC$, let $\theta(c)$ be the Boolean valued expression obtained by substitution of the variables in c. Then, for every value constraint $c \in VC$,
  if $\theta(c)$ is a non-exemplar literal, then $\theta(c)$ is true
  if $\theta(c)$ is an exemplar literal, then there exists a stream-value constraint, sc, where $sc \in SVC$, such that sc is more specific than $\theta(c)$.

Figure 9:
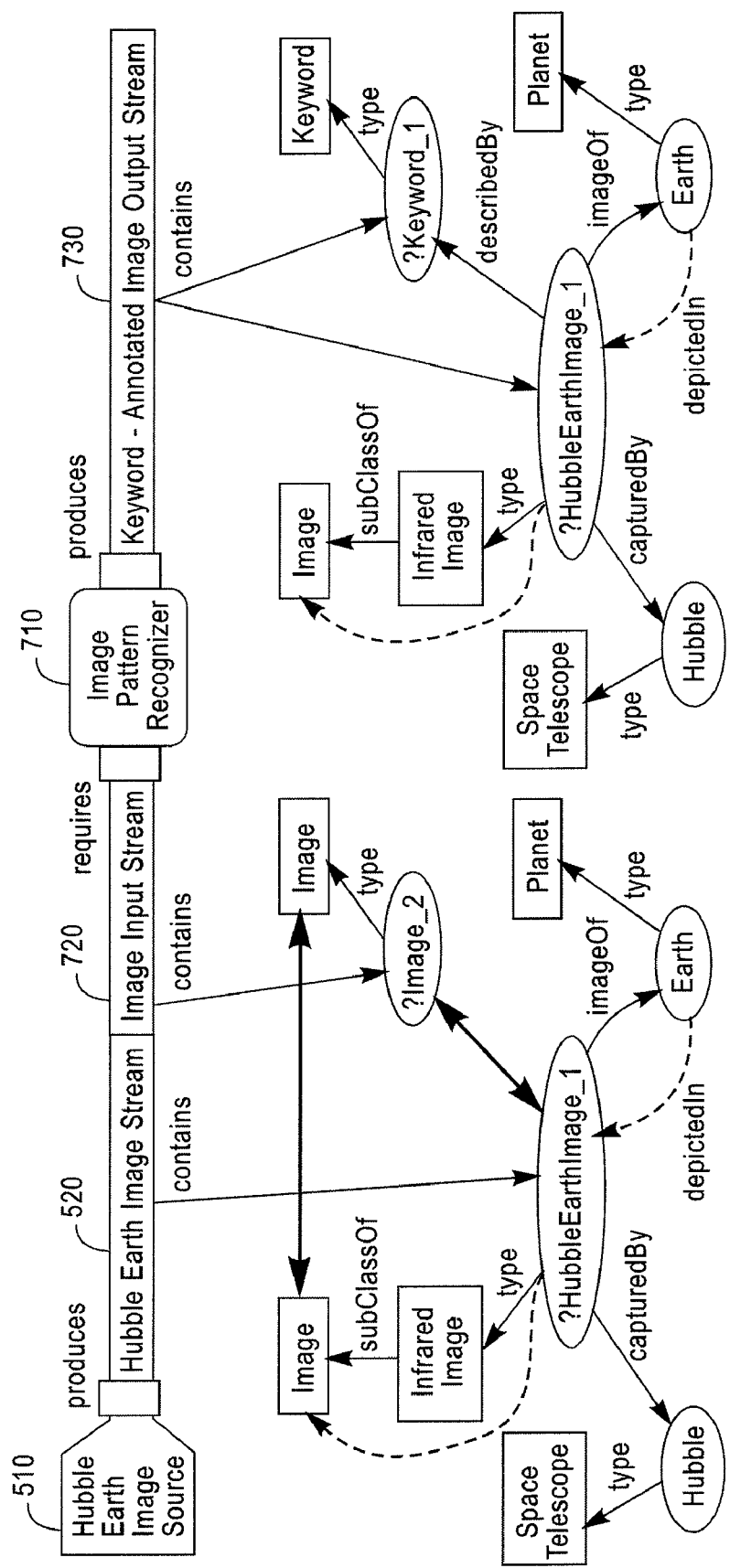
FIG. 9 illustrates matching a data source to a processing element according to an exemplary embodiment of the present invention.

The above definition is very generic. It allows the use of different kinds of reasoning to decide if a stream matches a stream-pattern. Our system does reasoning on a specific subset of DL called DLP (Description Logic Programs). We represent this match as $S \triangleright_\theta SP$ to state that stream S matches stream pattern, SP with a pattern solution, $\theta$. One way of looking at the above definition is that the stream should be more general than the stream-pattern. The stream should have at least as much semantic information as described in the stream pattern. An example of the match with the variable substitutions is shown in FIG. 9.

Associating a set of streams and parameter values with PE. We extend the definition of a match between a stream and a stream-pattern to provide the conditions for determining if a set of streams match the set of stream-patterns that describe the PE's input requirements, and if a set of parameter values are valid.

The stream-patterns representing the different input stream requirements of a PE may not be independent. Different stream-patterns may share variables, and thus, the assignment of variables to values for one stream pattern would also depend on any constraints associated with the variable in other stream patterns. Hence, it is not possible to look at each stream-pattern individually and determine if a certain stream matches the stream-pattern. All the stream-patterns must be treated holistically. In addition a PE may have zero or more configuration parameters, associated with datatype constraints.

Let $ISR(SP_1, SP_2, \ldots, SP_m)$ represent the set of stream-patterns that describes the m input stream requirements of a PE. Each stream pattern is of the form $SP_i(ID_i, IGP_i)$. Let Params $(p_1, \ldots, p_k)$ represent k configuration parameters to the PE.

Let $SS(S_1, \ldots S_m)$ represent a set of m streams. Each stream is of the form $S_i(SN_i, SD_i, SG_i)$. In addition, let PV $(v_1, \ldots, v_k)$ represent k parameter values. We define the set of stream-patterns, ISR to be matched by the set of streams, SS if and only if there exists a pattern solution, $\theta$, defined on all the variables in $\cup_{i=1}^{m} IGP_i \cup Params$, such that $S_i \triangleright_\theta SP_i$ for $i=1, \ldots m$. Also, the parameter values are valid if $\theta(p_j) = v_j$ and $v_j$ satisfies the type constraint associated with $p_j$ for $j = 1 \ldots k$.

Determining the output of a PB. When a set of input streams are connected to the PE, the PE generates output streams. The actual description of the output streams is generated by combining the descriptions of the input streams fed to the PEs with the stream-patterns describing the outputs of the PE in the PE's semantic description. We formally define this combination in terms of a graph transformation operation.

Let $ISR_i(ID_i, IGP_i), i=1 \ldots m$, be the in input streampatterns to a PE. Each $IGP_i$ can be considered to have a basic graph-pattern $L_i$ and a set of value constraints, $LVC_i$. Let $OSP_j(OD_j, OGP_j), j=1 \ldots n$, be the n output streampatterns of the PE. Each $OGP_j$ can be considered to have a basic graph-pattern $R_j$ and a set of value constraints, $RVC_j$. Let $\overline{L} = \cup_{i=1}^{m} L_i$ and $\overline{R} = \cup_{j=1}^{n} R_j$. The PE implements a graph transformation:

$$pe: \overline{L} \to \overline{R}$$

Now assume that the in input graphs have been matched to m streams generated by other components, i.e., $ISR_i$ is matched to stream $IS_i$, which has a basic stream-graph, $X_i$, for $i=1 \ldots m$. Let $\theta$ be the overall variable substitution function for all the variables in $\overline{L}$.

Let the output streams coming out of the PE, as a result of connecting the streams $IS_i$ to it, be represented as $OS_j$. Each $OS_j$ contains a basic stream-graph, $Y_j$. We determine each $Y_j$ using a graph homomorphism, $f: \theta(\overline{L}) \cup \theta(\overline{R}) \to \overline{X} \cup \overline{Y}$ where $\overline{X} = \cup_{i=1}^{m} X_i$ and $\overline{Y} = \cup_{j=1}^{n} Y_j$.

In our model of the PEs, f satisfies the following properties (for $i=1 \ldots m$ and $j=1 \ldots n$):

1. $f(\theta(L_i)) \subseteq X_i$. This means that each substituted input basic graph-pattern is a subgraph of the actual basic stream-graph of the stream that was matched to it. This follows from the entailment relation between the graphs as defined in the match, $\triangleright_\theta$, between the input stream-pattern and the stream.

2. $f(\theta(R_i)) \subseteq Y_i$. This means that each substituted output basic graph-pattern is a subgraph of the output stream-graph.

3. $f(\theta(\overline{L}) \backslash \theta(\overline{R})) = \overline{X} \backslash \overline{Y}$ and $f(\theta(\overline{R}) \backslash \theta(\overline{L})) = \overline{Y} \backslash \overline{X}$ where \ represents the graph difference operation. This means that exactly that part of X is deleted which is matched by elements of $\theta(\overline{L})$ not in $\theta(\overline{R})$, and exactly that part of $\overline{Y}$ is created that is matched by elements new in $\theta(\overline{R})$.

Using properties 2 and 3, it is possible to determine the outputs, $Y_j$, of a PE as a result of connecting $X_i$ to it. This operation is performed in two main steps. In the first step, we remove all the edges and vertices from X that are matched by $(\theta(\overline{L}) \backslash \theta(\overline{R}))$ to get a graph D, where $D = \overline{X} \backslash (\theta(\overline{L}) \backslash \theta(\overline{R}))$. We make sure that D is a legal graph, i.e., no edges are left dangling because of the deletion of the source or target vertices. We also remove any components in the graph that are disconnected from the set of exemplar individuals that appear in the output stream-graphs. In the second step, we glue D with $\overline{R} \backslash \overline{L}$ to get $\overline{Y}$.

An example of this process can be seen in FIG. 9. Notice how some of the semantics of the matched input stream 520/720 are carried over to the output stream 730.

It should also be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for modeling components of a stream processing application, comprising:
    defining an input message pattern of a processing element, wherein the input message pattern includes variables representing data objects that must be included in a message input to the processing element, and a graph pattern that semantically describes the data objects that must be included in the message input to the processing element; and
    defining an output message pattern of the processing element, wherein the output message pattern includes variables and new data objects, the variables and new data objects representing data objects that must be included in a message output from the processing element, and a graph pattern that semantically describes the data objects in the message output from the processing element,
    wherein the method is performed using a processor and every one of the variables in the output message pattern must be included in the input message pattern.

2. The method of claim 1, wherein the graph pattern that semantically describes the data objects that must be included in the message input to the processing element uses terms defined in ontologies represented in Web Ontology Language (OWL).

3. The method of claim 1, wherein the graph pattern that semantically describes the data objects in the message output from the processing element uses terms defined in ontologies represent in OWL.

4. The method of claim 1, further comprising:
    defining a set of variables that represent configuration parameters of the processing element.

5. The method of claim 4, further comprising:
    inputting a plurality of modeled processing element descriptions, each processing element description having a defined input and output message pattern and defined configuration;
    inputting a processing request, wherein the processing request includes a goal that is represented by a graph pattern that semantically describes a desired processing outcome; and
    assembling a processing graph that produces a stream that satisfies the desired processing outcome.

6. The method of claim 5, wherein assembling the processing graph comprises:
    matching a message output from a first processing element to an input message pattern of a second processing element if the message includes the data objects that must be included in a message input to the second processing element and if a graph that semantically describes data objects in the message satisfies the graph pattern that semantically describes the data objects that must be included in the message input to the second processing element.

7. The method of claim 6, further comprising:
    connecting the first processing element to the second processing element when the message is matched to the input message pattern of the second processing element.

8. The method of claim 7, further comprising:
    generating an output message of the second processing element by applying differences between the graph pattern that semantically describes the data objects that must be included in the message input to the second processing element and the graph pattern that semantically describes the data objects produced as output by the second processing element to the graph that semantically describes the data objects in the message based on a graph transformation operation.

9. The method of claim 1, further comprising:
    defining an output message pattern of a data source, wherein the output message includes exemplar terms, the exemplar terms representing data objects that must be included in a message output from the data source, and a graph that semantically describes the data objects in the message output from the data source.

10. The method of claim 9, wherein the graph that semantically describes the data objects in the message output from the data source is formed by OWL assertions.

11. The method of claim 9, further comprising:
    inputting a plurality of modeled processing element descriptions, each processing element description having a defined input and output message pattern;
    inputting a plurality of data source descriptions, each data source description having a defined output message pattern;
    inputting a processing request, wherein the processing request includes a goal that is represented by a graph pattern that semantically describes a desired processing outcome; and
    assembling a processing graph that includes at least one of the modeled processing elements or at least one of the modeled data sources that produces output messages that satisfy the desired processing outcome.

12. The method of claim 11, wherein assembling the processing graph comprises:
    matching a message output from a data source to an input message pattern of a processing element if the message includes the data objects that must be included in a message input to the processing element and if a graph that semantically describes data objects in the message satisfies the graph pattern that semantically describes the data objects that must be included in the message input to the processing element.

13. The method of claim 12, further comprising:
    connecting the data source to the processing element when the message is matched to the input message pattern of the processing element.

14. The method of claim 13, further comprising:
    generating an output message of the processing element by applying differences between the graph that semantically describes data objects in the message and the graph pattern that semantically describes the data objects that must be included in the message input to the processing element to the graph pattern that semantically describes the data objects in the message output from the processing element based on a graph transformation operation.

15. A system for modeling components of a stream processing application, comprising:
    a memory device for storing a program;
    a processor in communication with the memory device, the processor operative with the program to:
    define an input message pattern of a processing element, wherein the input message pattern includes variables representing data objects that must be included in a message input to the processing element, and a graph pattern that semantically describes the data objects that must be included in the message input to the processing element; and
    define an output message pattern of the processing element, wherein the output message pattern includes variables and new data objects, the variables and new data objects representing data objects that must be included in a message output from the processing element, and a graph pattern that semantically describes the data objects in the message output from the processing element, wherein every one of the variables in the output message pattern must be included in the input message pattern.

16. The system of claim 15, wherein the graph pattern that semantically describes the data objects that must be included in the message input to the processing element uses terms defined in ontologies represented in Web Ontology Language (OWL).

17. The system of claim 15, wherein the graph pattern that semantically describes the data objects in the message output from the processing element uses terms defined in ontologies represent in OWL.

18. The system of claim 15, wherein the processor is further operative with the program to:
define a set of variables that represent configuration parameters of the processing element.

19. The system of claim 18, wherein the processor is further operative with the program to:
receive a plurality of modeled processing element descriptions, each processing element description having a defined input and output message pattern and defined configuration;
receive a processing request, wherein the processing request includes a goal that is represented by a graph pattern that semantically describes a desired processing outcome; and
assemble a processing graph that produces a stream that satisfies the desired processing outcome.

20. The system of claim 19, wherein when assembling the processing graph the processor is further operative with the program to:
match a message output from a first processing element to an input message pattern of a second processing element if the message includes the data objects that must be included in a message input to the second processing element and if a graph that semantically describes data objects in the message satisfies the graph pattern that semantically describes the data objects that must be included in the message input to the second processing element.

21. The system of claim 20, wherein the processor is further operative with the program to:
connect the first processing element to the second processing element when the message is matched to the input message pattern of the second processing element.

22. The system of claim 21, wherein the processor is further operative with the program to:
generate an output message of the second processing element by applying differences between the graph pattern that semantically describes the data objects that must be included in the message input to the second processing element and the graph pattern that semantically describes the data objects produced as output by the second processing element to the graph that semantically describes the data objects in the message based on a graph transformation operation.

23. The system of claim 15, wherein the processor is further operative with the program to:
define an output message pattern of a data source, wherein the output message includes exemplar terms, the exemplar terms representing data objects that must be included in a message output from the data source, and a graph that semantically describes the data objects in the message output from the data source.

24. The system of claim 23, wherein the graph that semantically describes the data objects in the message output from the data source is formed by OWL assertions.

25. The system of claim 23, wherein the processor is further operative with the program to:
receive a plurality of modeled processing element descriptions, each processing element description having a defined input and output message pattern;
receive a plurality of data source descriptions, each data source description having a defined output message pattern;
receive a processing request, wherein the processing request includes a goal that is represented by a graph pattern that semantically describes a desired processing outcome; and
assemble a processing graph that includes at least one of the modeled processing elements or at least one of the modeled data sources that produces output messages that satisfy the desired processing outcome.

26. The system of claim 25, wherein when assembling the processing graph the processor is further operative with the program to:
match a message output from a data source to an input message pattern of a processing element if the message includes the data objects that must be included in a message input to the processing element and if a graph that semantically describes data objects in the message satisfies the graph pattern that semantically describes the data objects that must be included in the message input to the processing element.

27. The system of claim 26, wherein the processor is further operative with the program to:
connect the data source to the processing element when the message is matched to the input message pattern of the processing element.

28. The system of claim 27, wherein the processor is further operative with the program to:
generate an output message of the processing element by applying differences between the graph that semantically describes data objects in the message and the graph pattern that semantically describes the data objects that must be included in the message input to the processing element to the graph pattern that semantically describes the data objects in the message output from the processing element based on a graph transformation operation.

29. A computer program product comprising a non-transitory computer useable medium having computer program logic recorded thereon for modeling components of a stream processing application, the computer program logic comprising:
program code for defining an input message pattern of a processing element, wherein the input message pattern includes variables representing data objects that must be included in a message input to the processing element, and a graph pattern that semantically describes the data objects that must be included in the message input to the processing element; and
program code for defining an output message pattern of the processing element, wherein the output message pattern includes variables and new data objects, the variables and new data objects representing data objects that must be included in a message output from the processing element, and a graph pattern that semantically describes the data objects in the message output from the processing element,
wherein every one of the variables in the output message pattern must be included in the input message pattern.

* * * * *